Dec. 19, 1939.  G. B. GARRETT ET AL  2,184,252
SPRING LOCK WASHER AND THE LIKE
Filed Dec. 8, 1937  2 Sheets—Sheet 1
FIG. I.
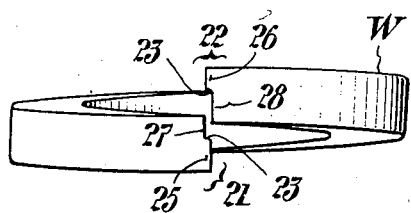
FIG. III.
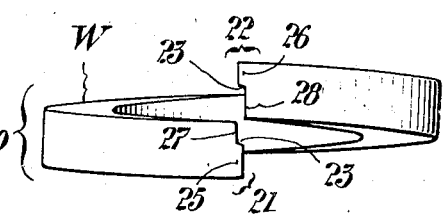
FIG. II.
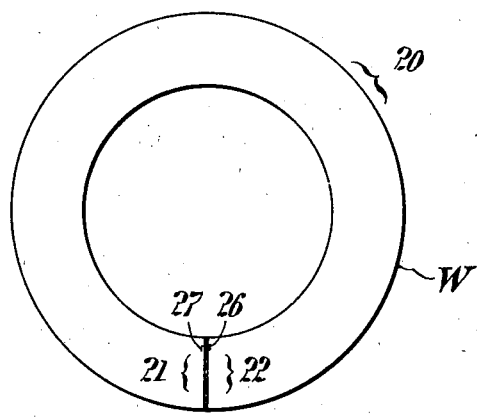
FIG. IV.
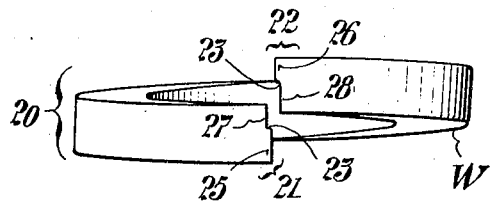
FIG. V.
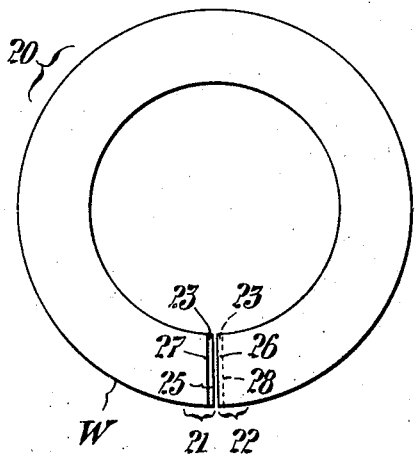
FIG. VI.
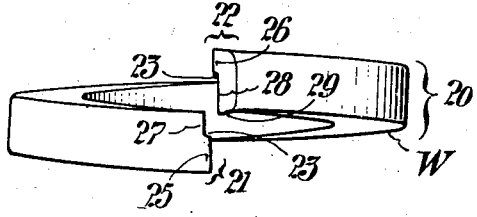
FIG. VII.
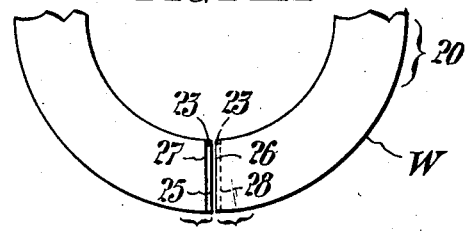
WITNESSES:
Hubert Fuchs
William Bell, Jr.
INVENTORS:
George B. Garrett &
William H. Thornton,
BY Paul & Paul
ATTORNEYS.

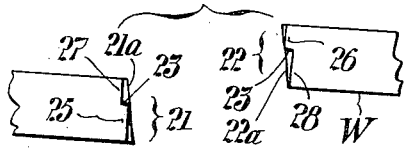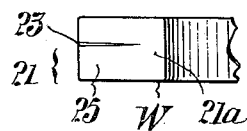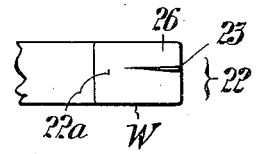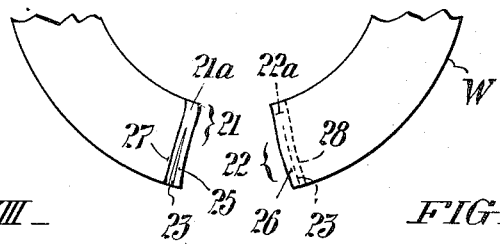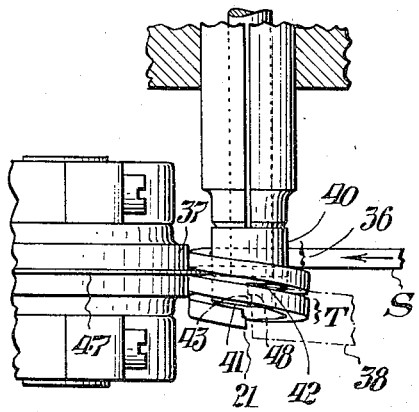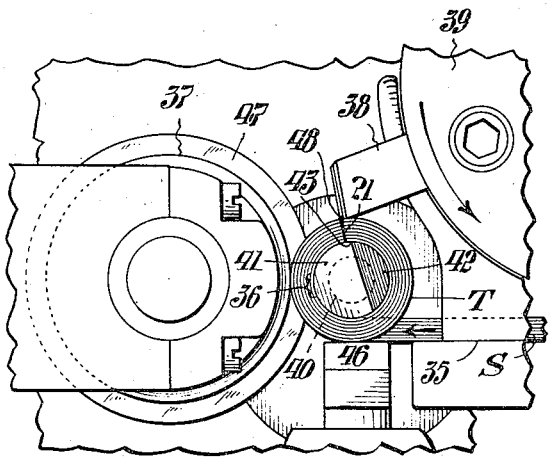

Patented Dec. 19, 1939

2,184,252

UNITED STATES PATENT OFFICE 2,184,252

SPRING LOCK WASHER AND THE LIKE

George B. Garrett, West Dettford Township, Gloucester County, N. J., and William H. Thornton, Philadelphia, Pa., assignors to George K. Garrett Company, Inc., Philadelphia, Pa., a corporation of Delaware Application December 8, 1937, Serial No. 178,630

3 Claims. (Cl. 151—36)

This invention relates to ring-like or annular devices of split type, whose ends are offset relative to one another in the axial direction of the ring. The invention is especially adapted and advantageous for spring lock washers, and is hereinafter explained with particular reference to this use. However, it is also applicable to annular devices for other purposes.

A spring lock washer is commonly used around a bolt under its nut, with the purpose of preventing the nut from jarring loose and unscrewing. To be thus effective, the washer must exert a sufficient degree of spring pressure or "tension" in the axial direction; and its ends should present sharp, hard corners that tend to bite into the metal of the nut, so as to resist turning of the nut in a direction to unscrew it. The sufficiency of such spring pressure depends on the elastic characteristics of the metal of the washer, on its proportions and dimensions, and on the amount of elastic deformation imposed on the washer when the nut is tightened up. The offsetting of the ends of the split ring constituting the washer has the effect of producing elastic deformation and spring pressure as the nut is screwed against the washer. A washer of good spring steel (properly tempered) having the form of a one-turn helix can be properly tensioned by tightening the nut until the helix is squeezed flat.

In modern quantity production of automobiles, for instance, economy in cost depends on exceedingly rapid assembling of parts by highly paid workmen. As lock washers are used in enormous quantities, it is important that a bunch of washers seized without looking from a bulk supply should all be instantly usable, without any being interengaged or tangled together; for the cost of a workman's time spent in untangling washers far exceeds the cost of the washers.

It is important, of course, to produce lock washers that cannot tangle together without any increase in manufacturing cost by reason of the features that prevent entanglement, and without any impairment of other good qualities. To prevent possibility of entanglement, it is not enough that the interval between square ends of a split washer ring be less than the smaller dimension of the washer stock, as shown, for example, in U. S. Patent No. 961,204, granted June 14, 1910, to C. F. Beers; for two such helical washers disposed in the same plane (as when resting on a flat surface), with their divided ends in juxtaposition, can be entangled or interlocked by merely pushing them edgewise against one another. And it will not do simply to overlap the square ring ends circumferentially to prevent entanglement in this way, because this would prevent flattening out the helical washer under a nut. If, again, the circumferentially overlapped ring ends are beveled, as shown in British Patent No. 1230 of 1873 to Grover, in order to permit flattening out the washer, then the angle of bevel and the interval between the beveled surfaces must be correctly proportioned, both in design and in actual manufacture, in order to prevent entanglement. Moreover, the acute angles of the beveled ring ends tend to "draw soft" when the washer is spring-tempered, and hence do not bite properly to hold a nut against unscrewing.

The present invention overcomes such difficulties and meets all practical requirements by a novel form of non-tangling split ring device. Various features and advantages of the invention will appear from the following description of species or forms of embodiment, and from the drawings.

In the drawings, Fig. I is an edge view of a ring or washer of one preferred form embodying the invention; and Fig. II is a plan view of this washer.

Fig. III is an edge view of a ring or washer of modified form conveniently embodying the invention.

Fig. IV is an edge view of yet another form of washer; and Fig. V is a corresponding plan view.

Fig. VI is an edge view illustrating a further modification; and Fig. VII is a corresponding fragmentary plan view.

Fig. VIII is a fragmentary edge view of adjacent ends of a washer with modified end surfaces; Fig. IX is a corresponding plan view; and Figs. X and XI are end-on views of the ends of the washer.

Fig. XII is a fragmentary front side view of a washer-making mechanism; and Fig. XIII is a corresponding plan view.

Figs. I and II show a spring lock washer comprising substantially one helical turn or 360 degree segment 20 of thin, flat metal stock of rectangular cross-section. The ends 21, 22 of this washer ring are substantially square with the stock—being defined by plane surfaces that extend parallel with the axis of the helix—and are essentially radial and parallel with one another. The general interval or clearance between these ends 21, 22, must, of course, be less than the smaller dimension of the stock, and may (as shown) be very much less.

Each of the end faces 21, 22 presents an offset or jog 23 crosswise of the axis of the washer, here shown as of relatively slight extent or "depth" circumferentially of the washer—much less, indeed, than the smaller dimension of the metal stock. As shown especially in Fig. I, the joggled end faces 21, 22 interlap one another somewhat, both circumferentially and axially of the washer: i. e., the narrow surfaces of the jogs 23, 23 partly lie opposite one another, and the set-back surfaces also partly lie opposite one another. Or, to state the matter differently, the projecting end portions 25, 26 determined by the offsets 23, 23 overlap circumferentially of the washer and crosswise of its axis, and the corners of the set-back portions 27, 28 overlap axially. The pitch of this washer approaches but does not quite equal the axial dimension of the stock. In the present instance, the end faces 21, 22 reciprocally correspond to one another as regards their offset features, including the circumferential depths of the offsets.

The conformation and inter-relations of the end faces 21, 22 effectively prevent tangling or interlocking of washers; yet they allow a washer to flatten properly under a nut, even with very small clearance between the opposed surfaces. In manufacture, moreover, the juxtaposition of the corners at 27, 28 affords a conspicuous remainder that the end faces 21, 22 must be brought into relations that will permit proper flattening of the washer—without necessity for inspection (with gauges) as required with washers having simple beveled ends. Moreover, the projections 25, 26 are relatively massive, so that they do not tend to "draw soft" when the washers are spring-tempered to give them proper resiliency, but remain hard, and bite effectively under a nut. The circumferential extent of the offsets 23, 23 as here shown is so slight that they do not substantially affect the flow of heat in the ends 21, 22 in tempering.

The washer illustrated in Fig. III differs from that of Figs. I and II in that while the offset faces 21, 22 (or, to state it differently, their end projections 25, 26) interlap circumferentially of the washer and crosswise of its axis, these faces (or the corners of their set-back portions 27, 28) do not interlap axially. The helical pitch of this washer approximates and slightly exceeds the axial dimension of the stock. However, the circumferential interlap suffices to prevent entanglement of such washers.

In the washer shown in Figs. IV and V, the reverse is the case: i. e., the offset faces interlap axially, but not circumferentially, although the washer is nearly or substantially a 360 degree segment. The helical pitch of the washer approximates but does not quite equal the axial dimension of the stock. The axial interlap prevents entanglement.

Figs. VI and VII illustrate a variant of the washer shown in Figs. IV and V, characterized by an axial projection or bulge 29 at the corner of one end of the stock, directly opposite the other end of the stock. Such a washer may have a helical pitch fully equal to the axial dimension of its stock, or even exceeding it, as well as an axial interlap of the end faces 21, 22 practically equivalent to what is shown in Figs. I and IV. As shown in Figs. VI and VII, the projection 29 is formed by slightly mashing inward, radially, the corner or edge of the stock end 22, so as to spread or bulge out the metal in the axial direction.

While a double interlap of the offset end faces 21, 22 as shown in Figs. I and II is preferred, yet in commercial manufacture many washers with single interlap such as illustrated in Fig. III or in Figs. IV and V are likely to be produced, and will be found practically satisfactory—as well as washers such as shown in Figs. VI and VII.

Figs. VIII—XI illustrate unobjectionable variations of end face conformation that may arise in connection with any of the types of interlap illustrated in Figs. I—VII. The essential characteristic of these end face variations is that while the offset feature 23 is like that illustrated in Figs. I—VII at the outer periphery of the washer, yet this offset does not extend clear across the whole radial width of an end face 21 or 22, but terminates or "fades out" at some intermediate point, leaving the rest of the face 21 or 22 all in one unbroken surface 21a or 22a—shown as somewhat inclined relative to the axis of the washer. The exact conformations and inter-relations of these inclined surfaces 21a, 22a is relatively unimportant, provided only the clearance or interval between them is enough to let the washer flatten out properly under a nut: e. g., these faces 21a, 22a need not be parallel with one another, nor extend radially, nor even be really flat or plane, and the interval between them may exceed the smaller dimension of the washer stock. Such irregularities as regards the surfaces 21a, 22a are permissible because the offset features 23, 23 are present at the periphery of the washer to prevent its entanglement with other similar washers, just as in Figs. I-VII.

The advantages of the invention and the significance of the variations illustrated in Figs. III-XI will be more apparent from consideration of one preferred method of making washers, as illustrated in Figs. XII and XIII. As here shown, the washer stock S, consisting of spring steel wire or rod in its soft state, is forcibly pushed or fed along (to the left) through a guideway 35 and under an arbor 36 against an idle abutment roller 37, and is coiled into a helix around the arbor. From the helical coil T thus continuously produced, successive sections or turns constituting the washers W are periodically cut off by a moving cutter 38, preferably carried by a head 39 constantly revolving about an axis parallel with the arbor 36, in proper relation to the feed of the stock S. Each cut thus made forms a face 21 of one washer W and a face 22 of the next succeeding washer. The metal may or may not shear exactly square or radially of the washer W. The portion of the arbor 36 around which the stock S initially bends and coils may consist of an idle roller 40, free to turn with the stock, while its front end portion 41 may be stationary, with a lateral recess 42 that accommodates the end of the revolving cutter 38 as it moves past. The angle 43 at the top of the recess 42 affords a stationary cutting edge against which the coiled stock is sheared off by the cutter 38. An anvil support 46 beneath the arbor 36 engages the coil turn just inside that to be cut off and sustains the arbor against the downward thrust of the cutter 38. The abutment roller 37 may have a peripheral spacing flange 47 of such thickness and so located as to engage between successive stock turns or convolutions as the stock S bends and coils around the arbor 36, giving the helical coil exactly the desired screw pitch. If this flange 47 is thin and properly placed, the elasticity of the stock S results in a tight helix T, with its convolutions in pressure-contact, so that when a turn is cut off, the ends assume the axial interlap illustrated in Figs. I and IV. Under usual conditions, the initial pressure of the cutter 38 on the stock S mashes down the corner at 29 about as already described in connection with Figs. VI and VII.

As shown in Fig. XIII, the cutter 38 is ground "square" (parallel with the axis of the helix T and the arbor 36), but with an offset or jog 48 corresponding to the offset 23 in Figs. I–XI. Accordingly, the ends of each washer-segment W cut from the coil T have reciprocally corresponding offsets 23 at the outer periphery of the washer, where the cutter 38 strikes the stock S. If the subjacent arbor edge 43 is ground square and offset like that of the cutter 38, the offset 23 may extend clear across each end face 21, 22 of each washer W, as in Figs. I–VII. But if the arbor edge 43 is merely ground on a slight slope relative to the arbor and coil axis, then the offset 23 will fade out in the width of the end faces 21, 22, as illustrated in Figs. VIII–XI.

The arbor edge 43 does not require frequent resharpening, and may therefore be ground by a careful and responsible workman, who will give it exactly the desired inclination. But the cutter 38 must be frequently reground, by ordinary workmen. It is easier to get such men to grind the cutter 38 square, with a satisfactory offset 48, than to induce them to grind it on a slope that will produce end faces on the stock beveled correctly throughout their entire radial width, so as to allow the washers to be flattened properly, yet keep them from entangling.

After being fabricated from soft stock S as just described, the washers W are hardened and drawn to the proper spring temper. In this operation, they contract circumferentially, to a slightly smaller radius, and their end faces 21, 22 draw together somewhat. This must, of course, be allowed for by making them with somewhat greater initial clearance between the end faces than is finally intended. Slight variations in contraction or in initial clearance are taken care of by the permissible variations already explained in connection with Figs. III–VII.

We claim as our invention and desire to secure by Letters Patent of the United States:

1. A lock washer comprising a helical segment substantially 360 degrees in total circumferential extent and having a pitch approximating the axial dimension of the washer stock, the end faces of said segment at the periphery of the washer reciprocally interlapping, so as to prevent entanglement of the washers when pushed edgewise against one another in the same plane, and being substantially entirely defined by surfaces extending substantially in the direction of the axis of the washer, so that the corners at opposite faces of the washer are too blunt-angled to draw soft in tempering, said end faces also being slightly offset or joggied circumferentially of the washer and crosswise of its axis, at its periphery, substantially in reciprocal correspondence to one another, so that even in cases where the offsets overlap circumferentially of the washer and crosswise of its axis, the latter can still flatten fully under compression, but the circumferential extent of the offsets being so slight as not substantially to affect the flow of heat in said ends in tempering.

2. A lock washer as set forth in claim 1 wherein the offsets of the end faces of the helical segment forming the washer reciprocally interlap circumferentially of the washer and crosswise of its axis, but the axial pitch of the helical segment exceeds the axial dimension of the washer stock and the ends of the helical segment do not interlap axially, whereby ample spring tensioning of the washer by complete flattening is assured, while entanglement of unflattened washers and coaction of the end faces to resist flattening are obviated.

3. A lock washer comprising a helical segment substantially 360 degrees in total circumferential extent and having a pitch approximating the smallest dimension of the washer stock, the end faces of said segment at the periphery of the washer being defined by surfaces extending substantially in the direction of the axis of the washer, but being offset or joggled circumferentially of the washer and crosswise of its axis substantially in reciprocal correspondence to one another, and reciprocally interlapping both axially and circumferentially of the washer, all so that the ends of two of the washers cannot pass one another when the washers are pushed edgewise against one another in the same plane.

GEORGE B. GARRETT.
WILLIAM H. THORNTON.